W. G. Beckwith,

Hoe.

No. 95,306.   Patented Sep. 28, 1869.

Witnesses
Jno. A. Ellis
James V. White

Inventor
W. G. Beckwith
per
T. H. Alexander
Atty.

United States Patent Office.

W. G. BECKWITH, OF LOWNDESBOROUGH, ALABAMA.

Letters Patent No. 95,306, dated September 28, 1869.

IMPROVEMENT IN HOES.

The Schedule referred to in these Letters Patent and making part of the same.

*To all whom it may concern:*

Be it known that I, W. G. BECKWITH, of Lowndesborough, in the county of Lowndes, and State of Alabama, have invented certain new and useful Improvements in Hoes; and I do hereby declare that the following is a full, clear, and exact description thereof, reference being had to the accompanying drawings, and to the letters of reference marked thereon, which form a part of this specification, in which—

Figure 1:
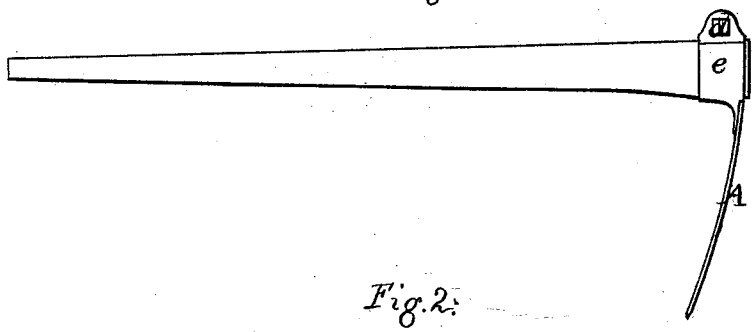

Figure 1 is a side view, with the handle properly adjusted, and

Figure 2:
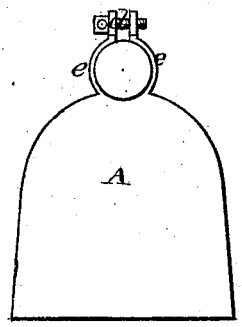

Figure 2, a front elevation, showing the peculiar manner of constructing the eye.

The nature of my invention consists in forming the upper portion of the eye of the hoe in two parts, and connecting them by means of a screw, or its equivalent, for the purpose of firmly securing the hoe to the handle.

To enable others skilled in the art to make and use my invention, I will now describe its construction and operation.

A represents the hoe, with its eye formed in separate parts $e\ e$.

A small space should be left between the upper portion of the parts or sides $e\ e$, so as to allow of their being drawn together by means of the screw $d$, which connects them, as seen in fig. 2.

The head of this screw may be both grooved in the usual way, and also provided with a hole through it, thus furnishing means by which it may be operated.

Thus it will be seen that in order to tighten the hoe to the handle, it is only necessary to contract the eye.

What I claim, and desire to secure by Letters Patent, is—

The hoe A, when constructed with a contracting or expanding eye, substantially as and for the purpose described.

In testimony that I claim the foregoing as my own, I affix my signature in presence of two witnesses.

W. G. BECKWITH.

Witnesses:
R. R. HARRIS,
THOMAS HARRISON.